United States Patent [19]

Booth et al.

[11] Patent Number: 4,496,084
[45] Date of Patent: Jan. 29, 1985

[54] BREADING MACHINE

[75] Inventors: Raymond E. Booth, Sandusky; Michael E. Miller, Bellevue, both of Ohio

[73] Assignee: Sam Stein Associates, Inc., Sandusky, Ohio

[21] Appl. No.: 421,169

[22] Filed: Sep. 22, 1982

[51] Int. Cl.³ .............................................. B05C 19/00
[52] U.S. Cl. ..................................... 222/282; 118/17; 118/24; 222/148; 222/415
[58] Field of Search .......................... 118/16, 17, 24; 222/290, 282, 415, 148

[56] References Cited

U.S. PATENT DOCUMENTS

| | | | |
|---|---|---|---|
| 2,111,663 | 3/1938 | Graemiger | 222/415 X |
| 2,788,922 | 4/1957 | Gmur | 222/415 X |
| 2,855,893 | 10/1958 | Greer et al. | |
| 3,045,640 | 7/1962 | Hill et al. | 118/16 |
| 3,647,189 | 3/1972 | Johnson | 118/16 X |
| 3,915,116 | 10/1975 | Booth | 118/16 |
| 3,967,583 | 7/1976 | Booth | 118/16 |
| 4,016,299 | 4/1977 | Booth | 426/293 |
| 4,128,160 | 12/1978 | Deal et al. | 198/657 |
| 4,333,415 | 6/1982 | Miller et al. | 118/16 |

Primary Examiner—John P. McIntosh
Attorney, Agent, or Firm—Baldwin, Egan, Walling & Fetzer

[57] ABSTRACT

A breading machine for selectively dispensing flour breading or free flowing breading and wherein the machine has a frame and conveyor means supported in the frame defining a conveyance path having a product inlet end and a product outlet end, and a hopper pivotally attached to the frame at the inlet end and movable between a breading dispensing position and a hopper cleaning position, frame support means pivotally attached to the frame at the outlet end and selectively adjustable to provide for flour breading of a food product wherein the said product is flipped over at the outlet end of the conveyor means or for free flowing breading to be applied to the food product wherein the said product exits from the conveyor means in the same manner in which it is initially introduced to the conveyor means, and wherein the frame support means is also adjustable between a conveyor means supporting position and a cleaning position above said conveyor means, and breading pumping slot means pivotally attached to the frame for providing breading to the input end of the conveyor means and adjustable between a breading dispensing position and a cleaning position.

12 Claims, 21 Drawing Figures

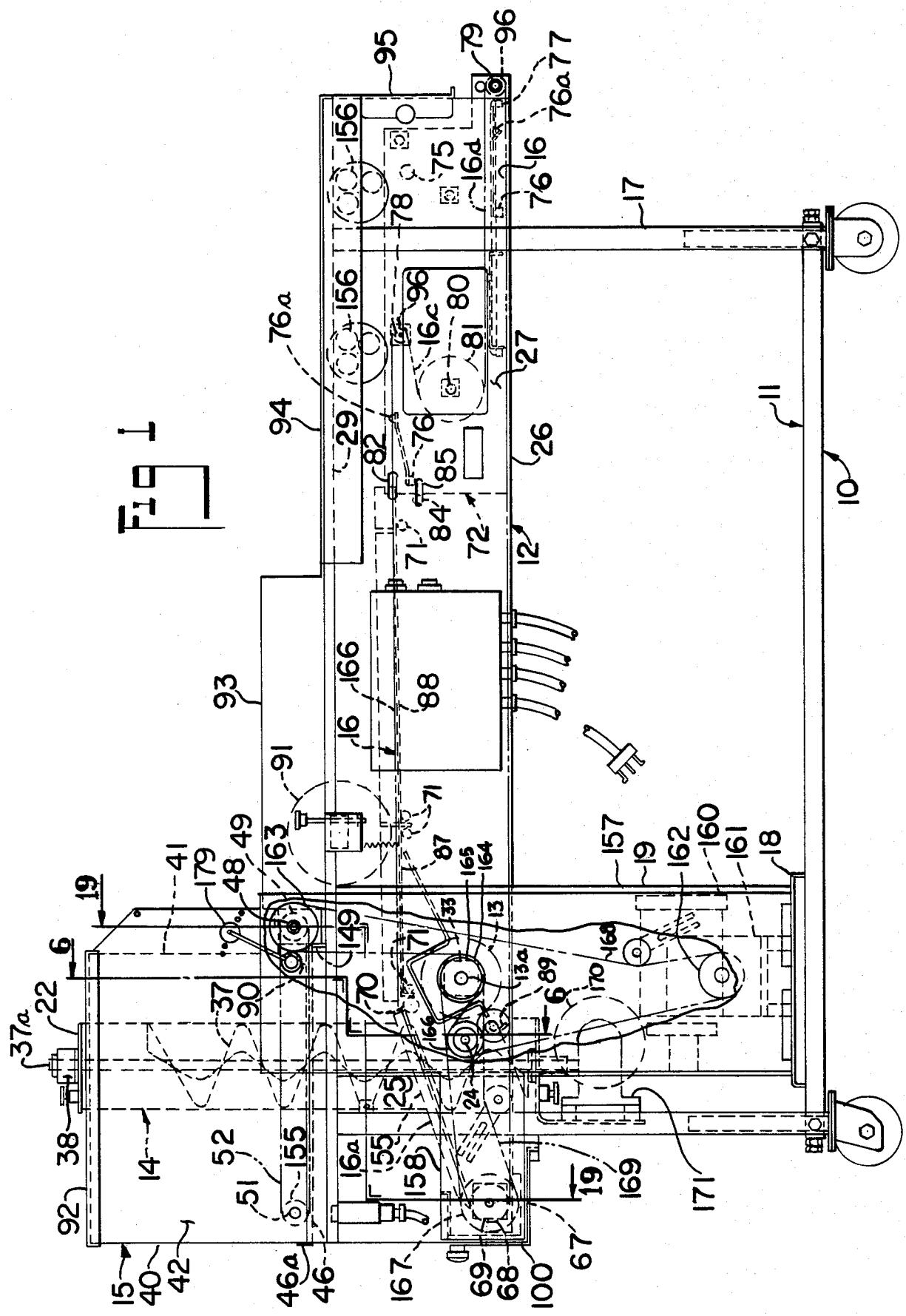

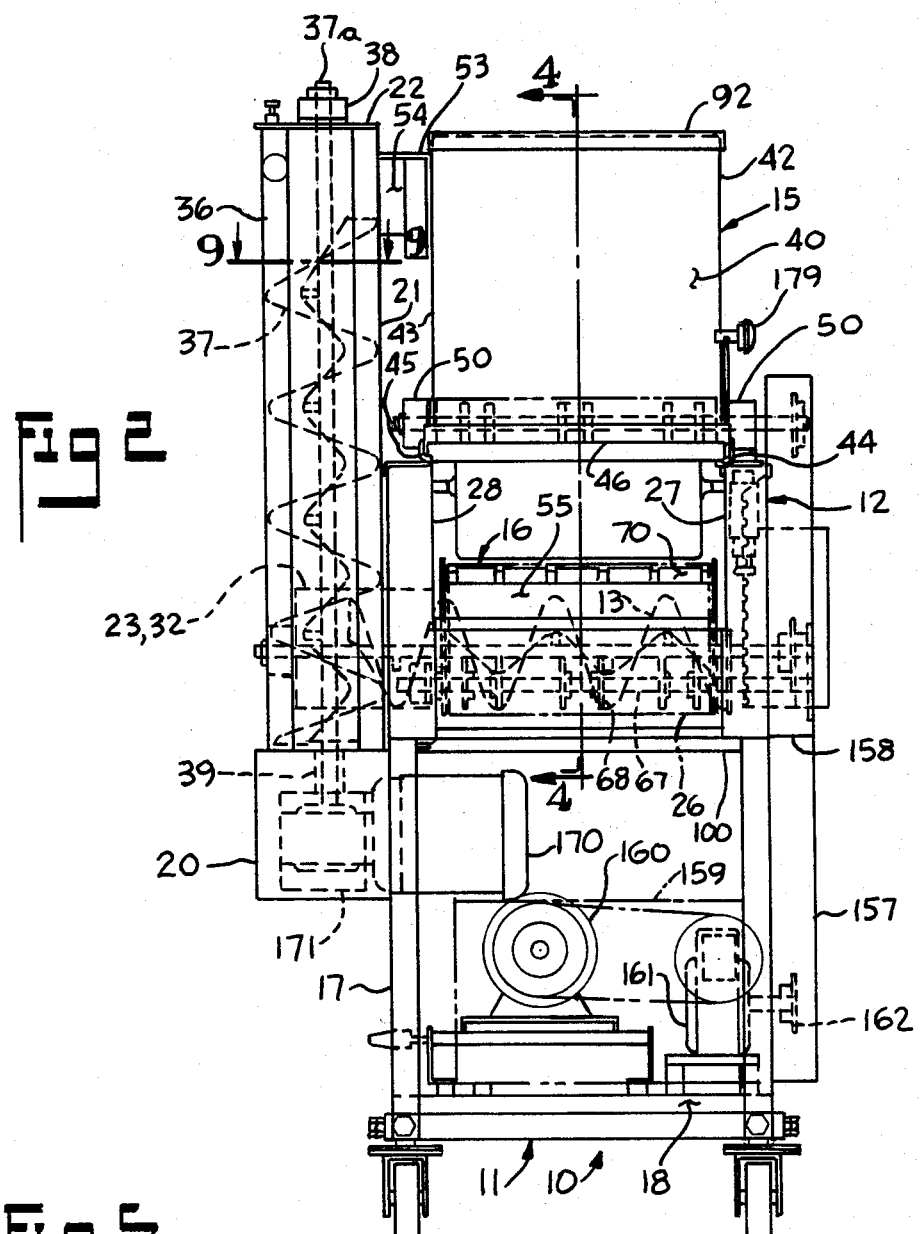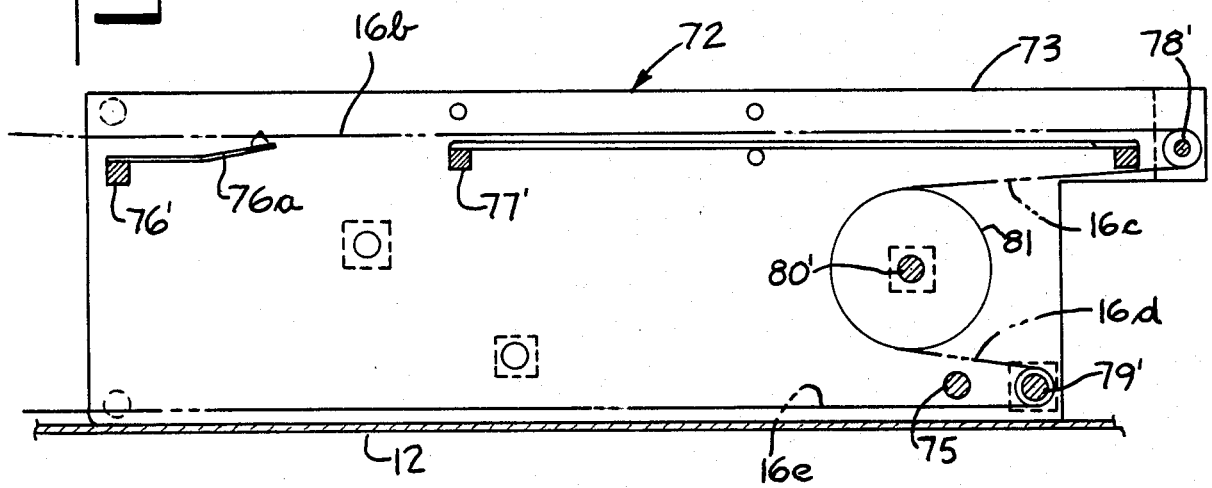

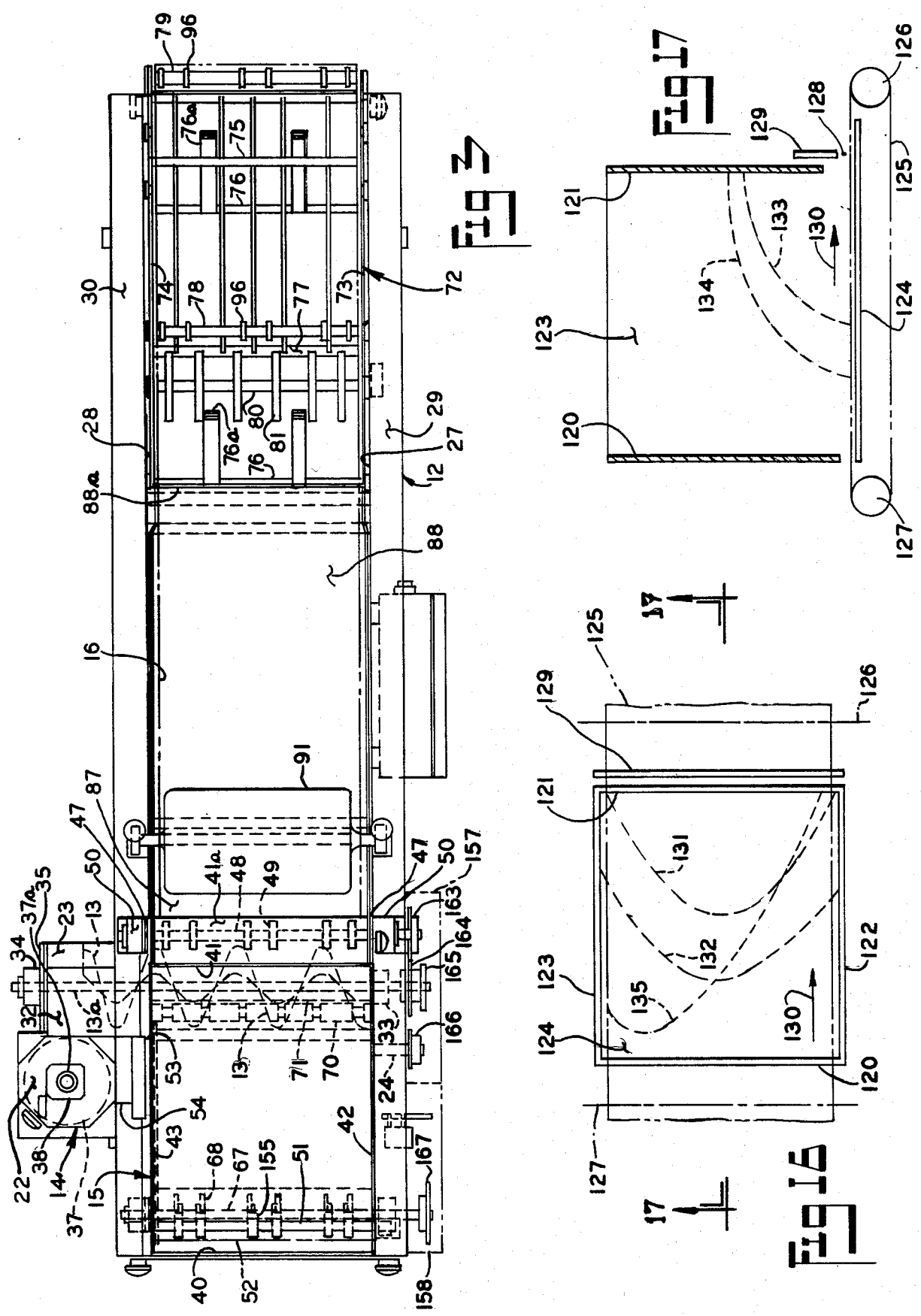

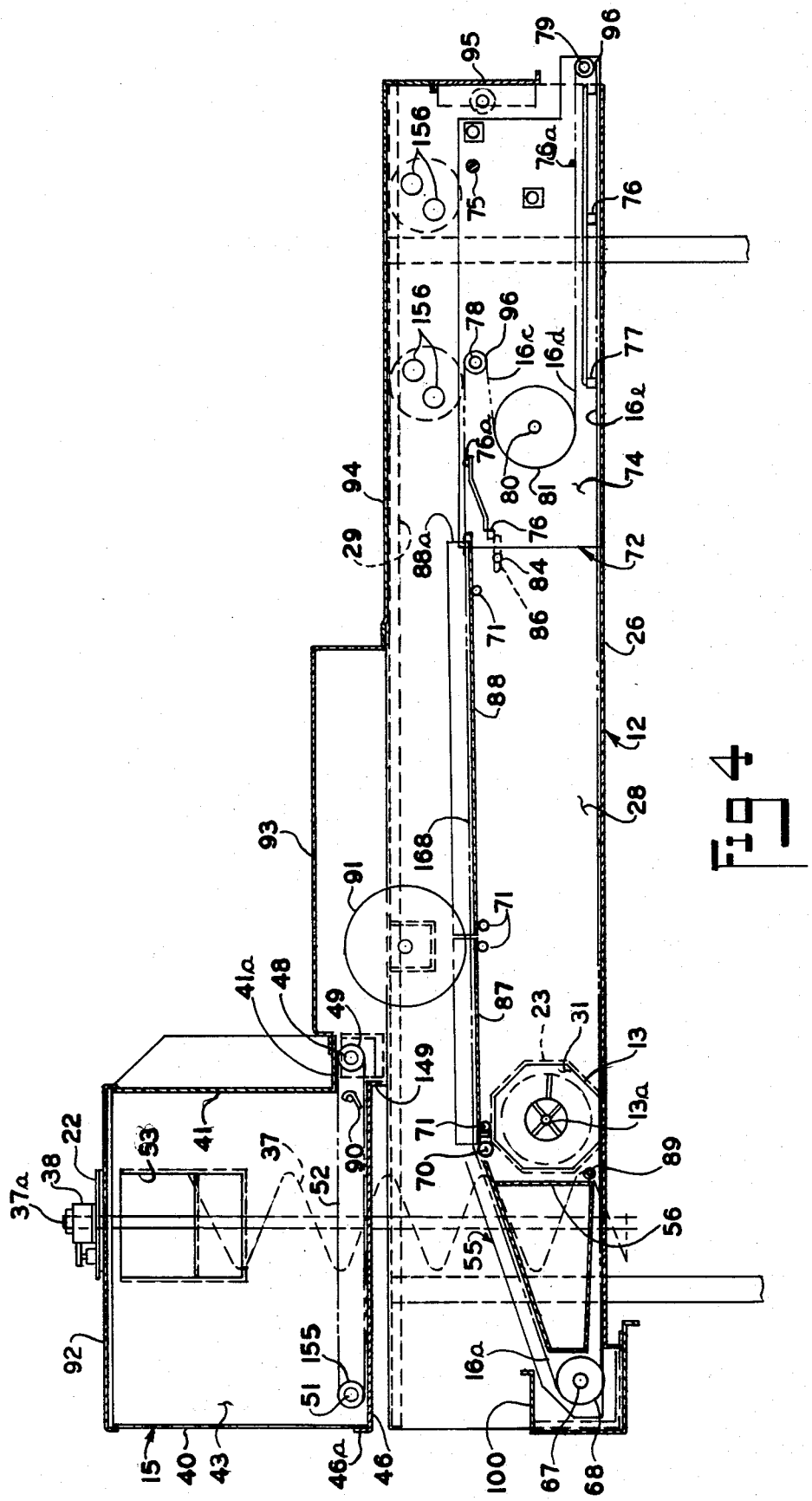

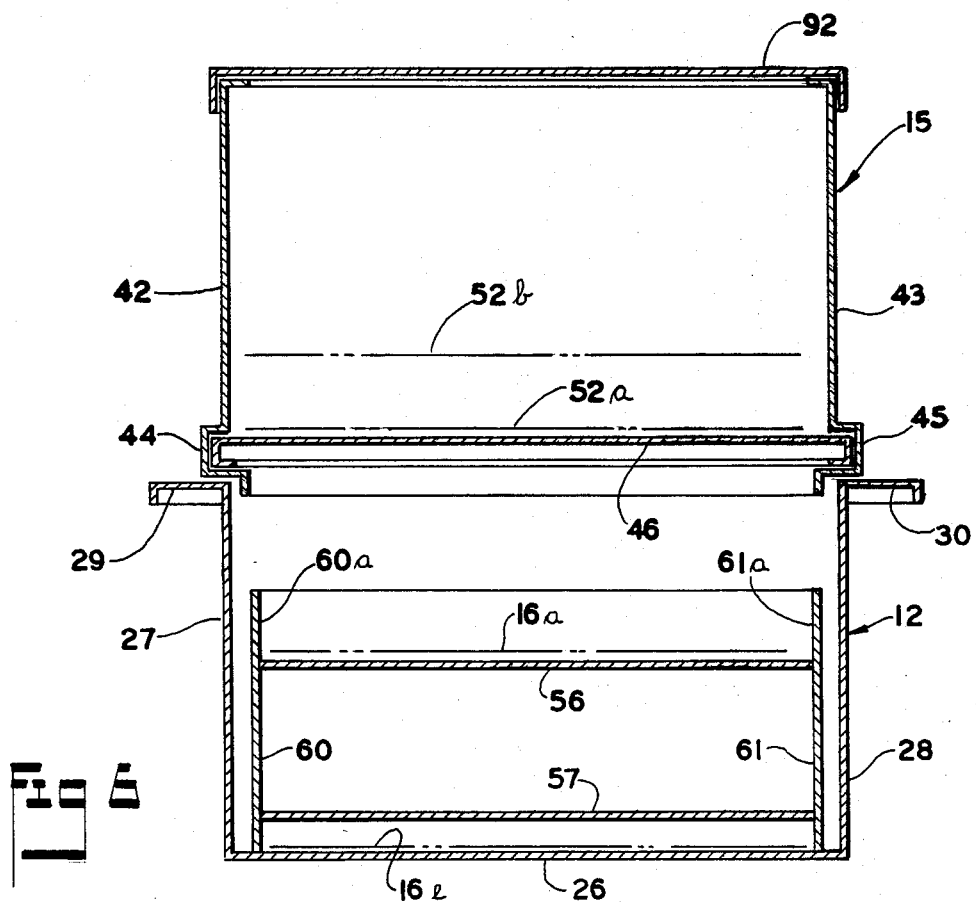
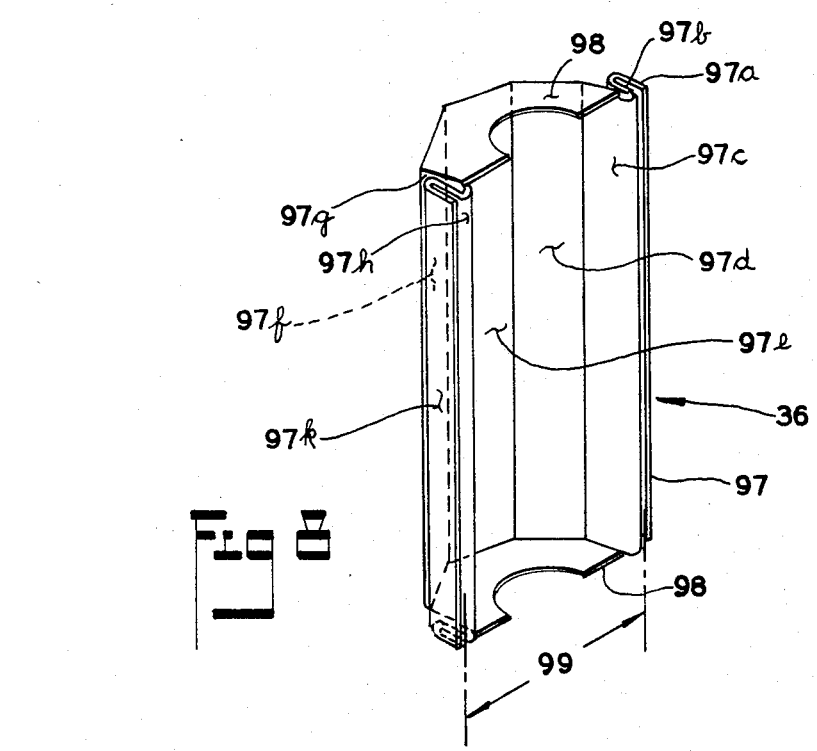

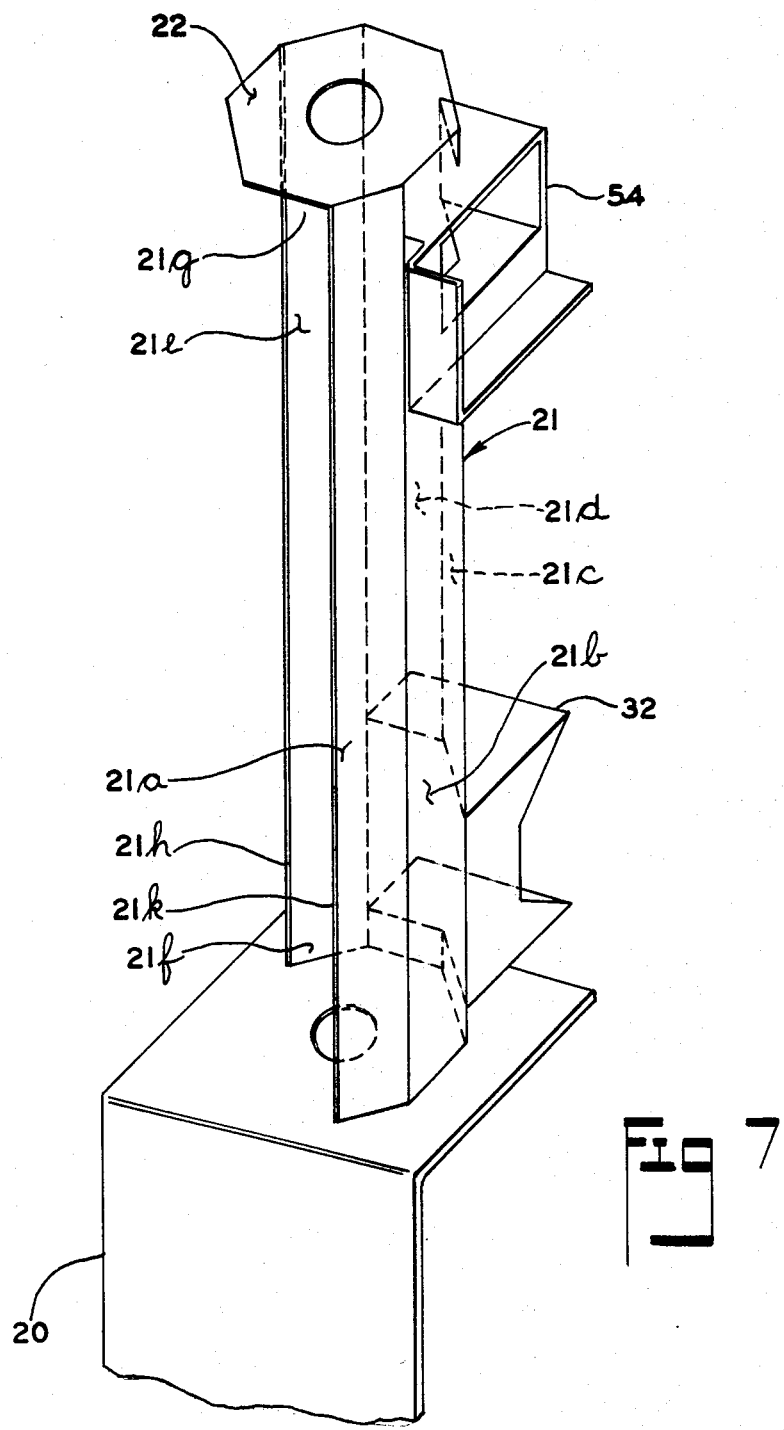

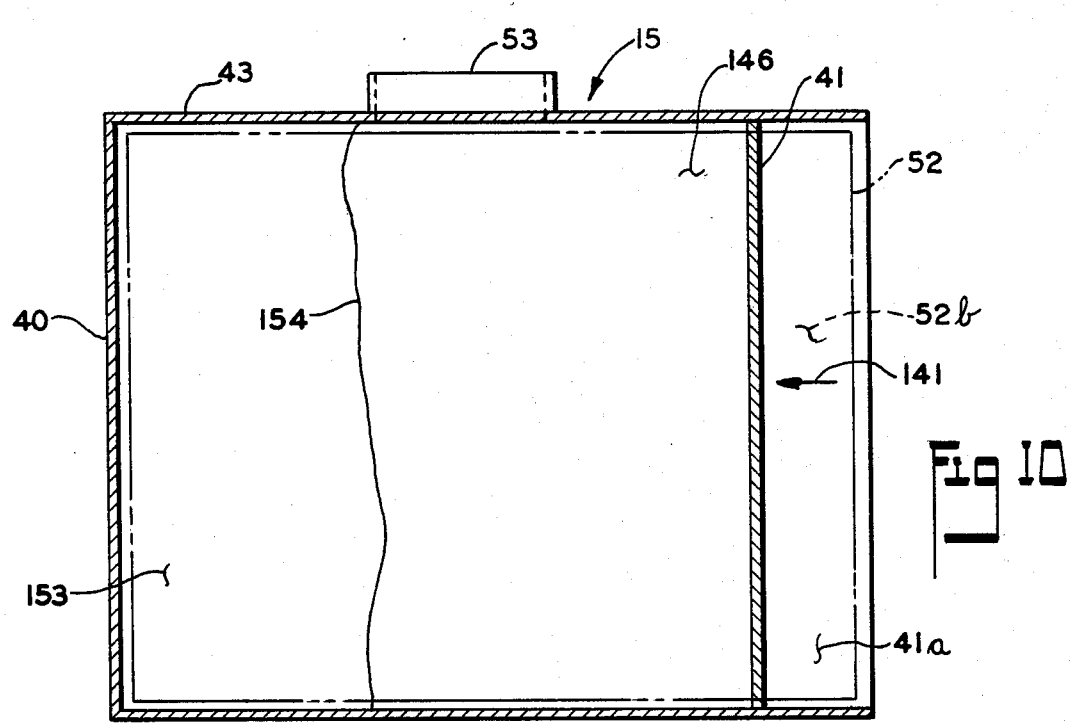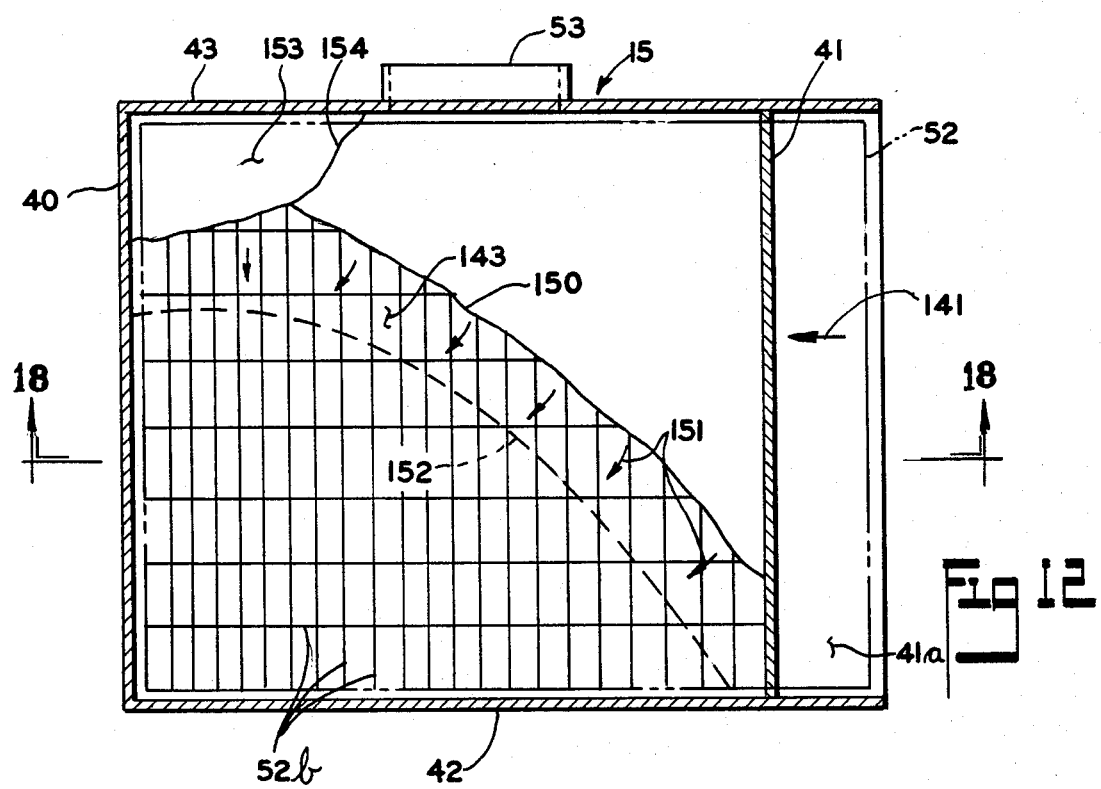

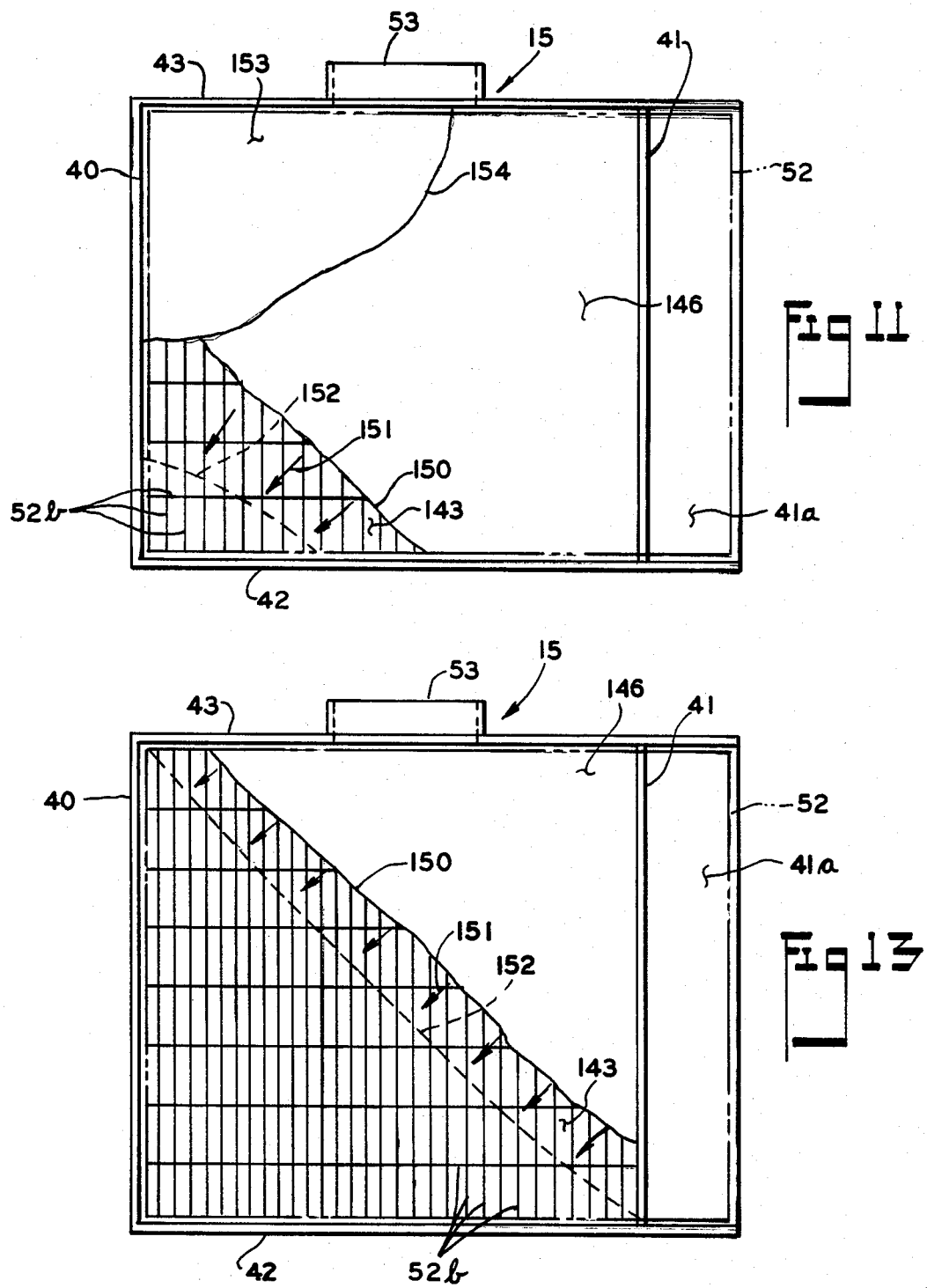

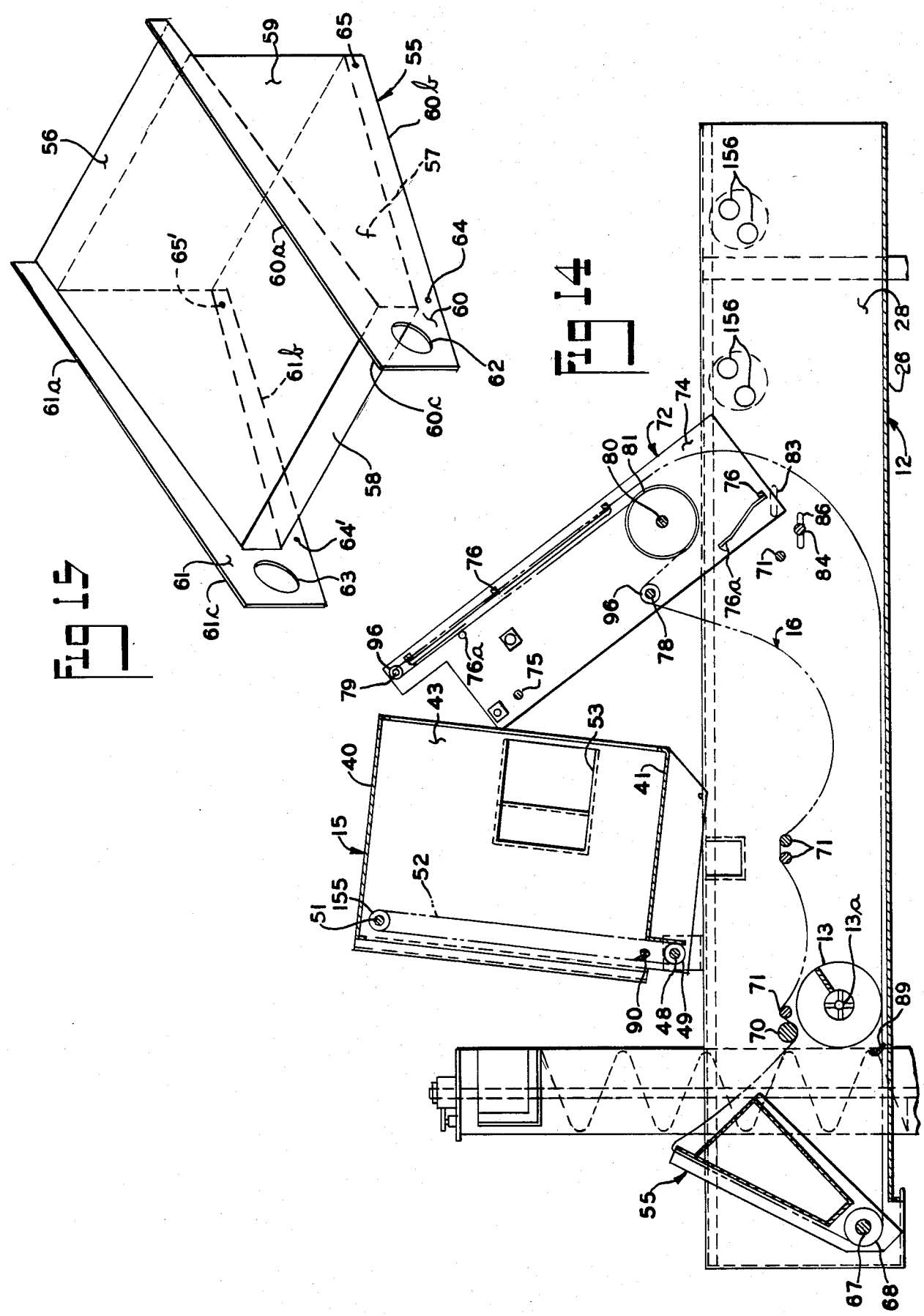

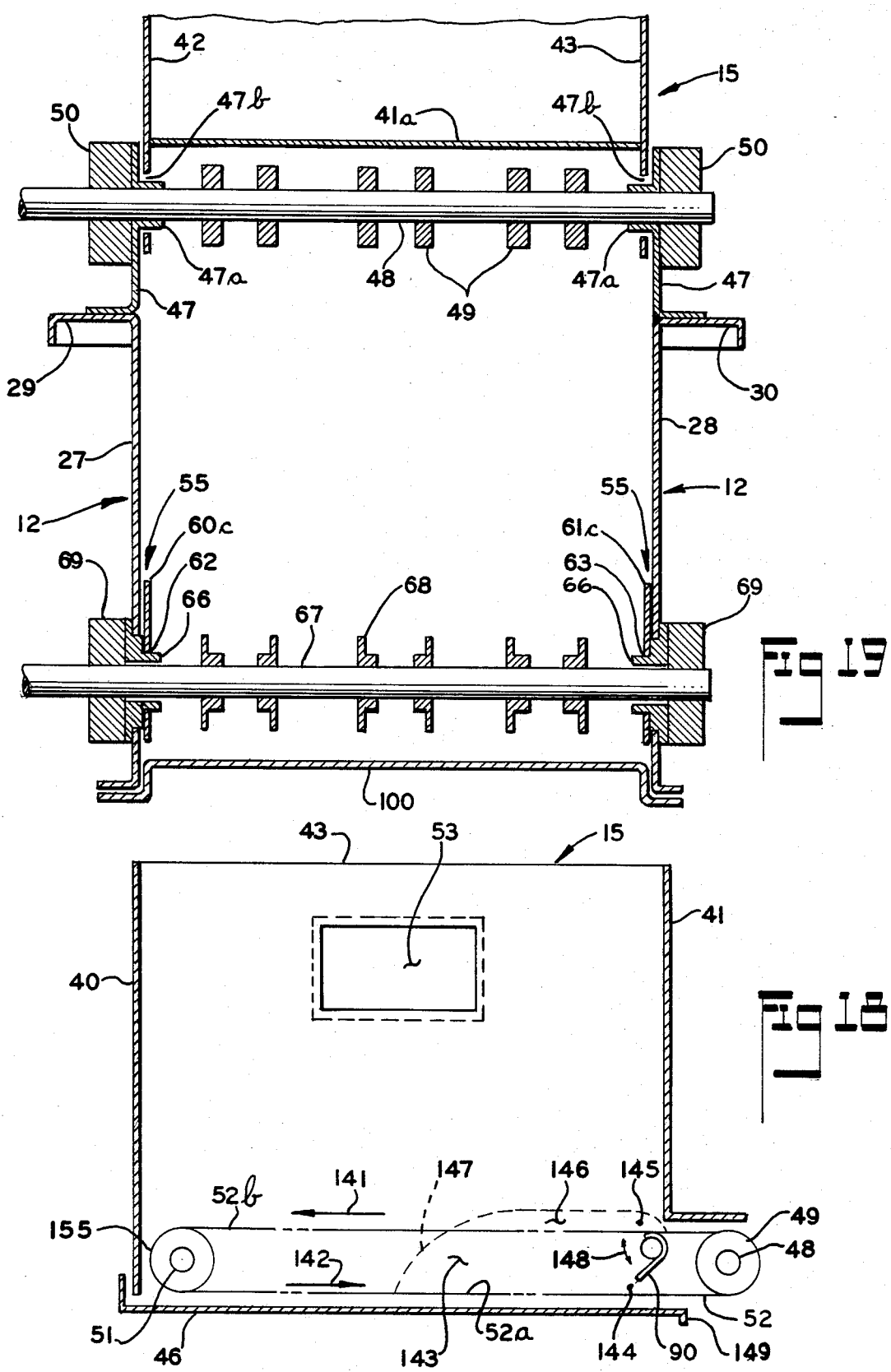

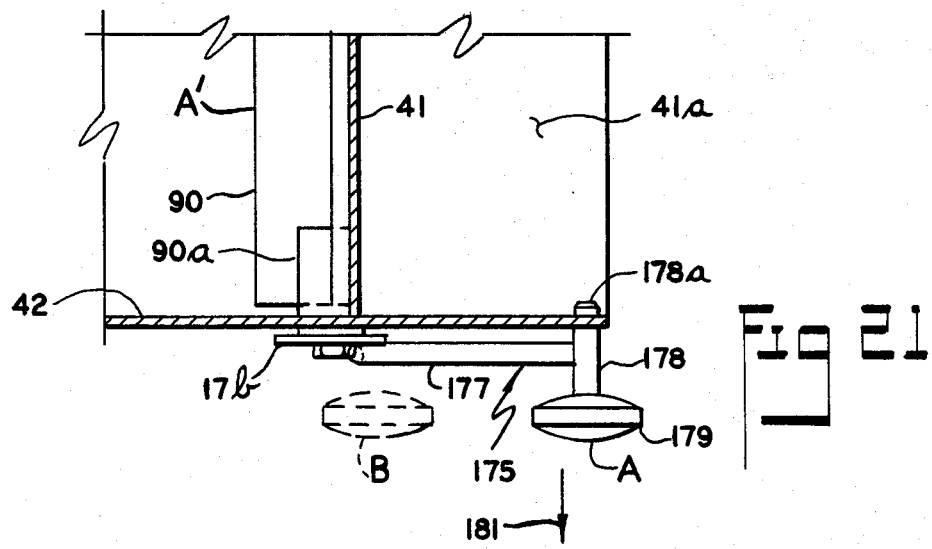
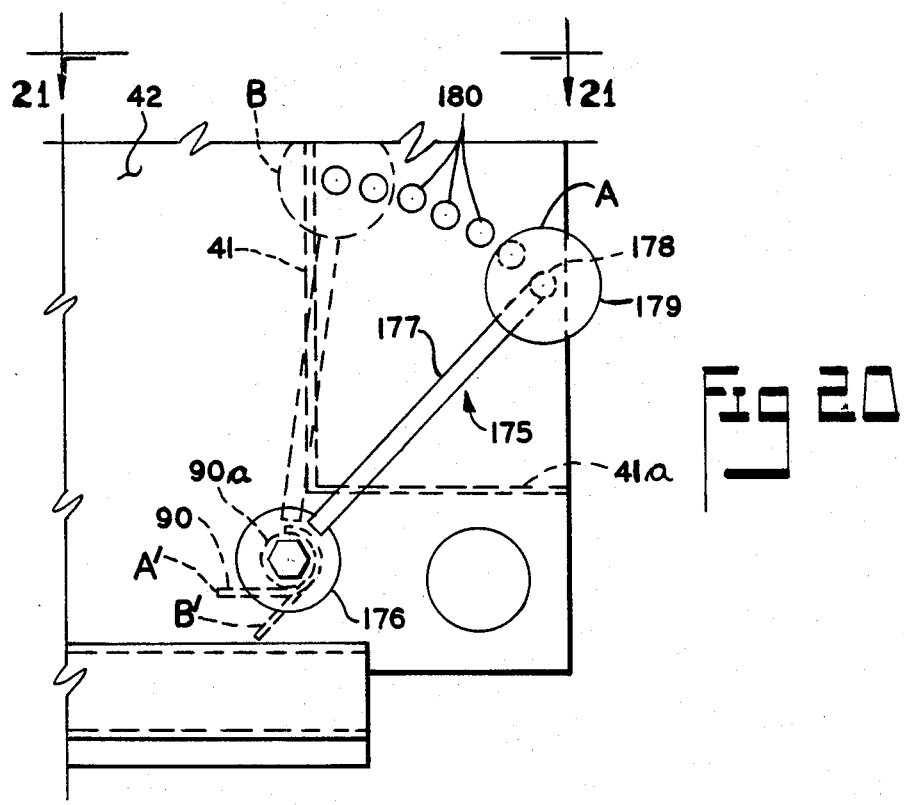

BREADING MACHINE

This invention relates to a breading machine for selectively dispensing flour breading or free flowing breading and wherein the machine has a frame and conveyor means supported in the frame defining a conveyance path having a product inlet end and a product outlet end, and a hopper pivotally attached to the frame at the inlet end and movable between a breading dispensing position and a hopper cleaning position, frame support means pivotally attached to the frame at the outlet end and selectively adjustable to provide for flour breading of a food product wherein the said product is flipped over at the outlet end of the conveyor means or for free flowing breading to be applied to the food product wherein the said product exits from the conveyor means in the same manner in which it is initially introduced to the conveyor means, and wherein the frame support means is also adjustable between a conveyor means supporting position and a cleaning position above said conveyor means, and breading pumping slot means pivotally attached to the frame for providing breading to the input end of the conveyor means and adjustable between a breading dispensing position and a cleaning position.

BACKGROUND OF THE INVENTION

In the field of large scale production of prepared foods, an ever larger variety of food pieces are machine coated with batter and breading before being fried in deep fat. Many additional processes may be required in the total preparation of the food pieces, but this invention relates solely to breading machines.

Breading is a dry farinaceous material which takes many forms and nearly always includes wheat flour in some form. It may also include other grain flour or meal, seasonings, spices, shortenings, etc. Most breading material may be roughly classified by its appearance into one of three classes; flour breading, free flowing breading, or Japanese style crumbs. Each of these has its own pecularities which affect the design of a machine used for applying the breading to food pieces.

For instance flour breading, which consists of finely ground dust-like particles with the normal appearance of wheat flour, have a tendency to pack under pressure. The packing action can make the breading bridge over openings as large as six inches in minor dimension, which in turn makes it difficult to remove from any type hopper in which the bottom slopes upwards and away from a bottom opening. Flour breadings do not flow freely. There are other pecularities of flour breadings which will become apparent later.

Breadings classified as free flowing are usually cracker meal consisting of reasonably hard and roughly spherical particles ranging in size from dust to about three-thirty seconds of an inch in diameter. Such breadings flow so freely that any containment enclosure must have provision to prevent leakage from any cracks or openings. Even a small hole may drain an entire containment enclosure down to the angle of repose of the breading. There are other pecularities of free flowing breadings which will become apparent later.

Breadings classified as Japanese style crumbs and the pecularities of their use are fully covered in U.S. Pat. No. 4,333,415—Miller-Hummel, and are not relevant to the subject invention.

The history of large scale use of breading machines in the food industry covers only about three decades. In that time period, breading machines have become larger and more complex, they run at higher speeds for longer times, and the proliferation of new food products and breading formulations has required that many variations and special machines be built. All of this, coupled with the high inflation rates of the last ten years and the high interest rates of the last few years, plus the sanitary and safety regulations of various governmental agencies, has made the high cost of a new breading machine more than many processors can afford.

As will be seen later, cost is a primary consideration in this invention, therefore it is relevant to discuss the complexity of two typical breading machines. The first is described and pictured in U.S. Pat. No. 4,128,160 Deal-Morley. In FIGS. 1 and 2 thereof, the hopper 13 may be seen to be composed of at least sixteen separate planar surfaces, many showing complex geometry, and many joinable only by welding. FIGS. 3, 4, 5 thereof show the construction of the fixed half of the vertical screw housing 20, again with many separate surfaces and complex geometry. In addition, FIG. 1 shows that the vertical screw housing 20 must extend from far below the product belt 12 to a point well above the hopper 13. In fact, a vertical screw housing may be over six feet long, which complicates the problem of maintaining relative dimensions with other parts. The extreme height of the vertical screw is necessary in order that free flowing breading may be directed from chute 19 to a central point in the hopper 13 for proper distribution to the product belt. This machine will not circulate flour breadings. FIGS. 6, 7 show the movable half 32 of the vertical screw housing and the ten vertical bends necessary to form it. FIGS. 8, 9, 10, 11 show the relationship between fixed housing 20 and movable housing 32. It must be understood that proper relationship is sometimes difficult to obtain due to distortions caused by welding, especially in a vertical screw as long as six feet. The side view shown in FIG. 1 indicates the presence of other complexities of form which are not numbered.

The second typical breading machine is described and pictured in U.S. Pat. No. 3,647,189—Johnson. FIGS. 3, 4, 9, 12 and 13 thereof show the complex configuration of the hopper 36, which again consists of multiple planes at various angles, and contains considerable mechanism for directing breading flow. The vertical screw housing 33 as seen in FIGS. 3 and 13, being placed at an acute angle with a horizontal plane, includes sheet metal shapes at both ends which are expensive to make and difficult to hold to dimensions. FIG. 3 illustrates the complexity of the drive for this machine, wherein the vertical screw 32, the hopper screw 43, the feeding device 56, the spreader screw 48, the discharge conveyor drive shaft 75 and the main drive pulley 49a for product belt 49 all must be power driven. FIG. 16 is a plan view of a level discharge conveyor with an open mesh conveyor belt. This type conveyor is used when free flowing breading is the coating material, because excess free flowing breading can be blown off the product by the arrangement of air compressor 93 and blower pipe 85 as seen in FIGS. 1 and 20. However, when flour type breading is the coating material, the excess usually cannot be blown off the product due to dust generation. Products coated with flour must be flipped over to remove excess breading, as illustrated in FIG. 24. It can be seen that if the owner of a breading machine of this type desires to use both flour and free flowing breadings, he may require two different discharge conveyors for the same machine. Even though the machine of U.S. Pat. No. 3,647,189 will circulate both free flowing and flour breadings, there are some flour breadings which require still further stirring and/or vibrating mechanisms in the hopper in order to correctly discharge the flour breading.

It may be readily understood that even though currently available breading machines can perform adequately while utilizing different styles of breading material, they can be quite costly due to complexity of form and mechanism. It might also be noted that complexity of form can make complete cleaning difficult due to the odd shapes of compound angles and the multiplicity of moving parts. Furthermore, the multiplicity and complexity of the moving parts of such breading machines almost guarantees high maintenance costs.

BRIEF DESCRIPTION OF THE INVENTION

One object of this invention is to provide a breading machine with a very simple and effective breading hopper suitable for use with either flour or free flowing breading.

Another object is to provide a breading machine with a very simple and effective vertical screw housing.

Another object is to provide a breading machine which is easily convertible from one type of excess breading recovery to a second type of excess breading recovery.

Another object is to provide a breading machine which is easy to clean effectively.

Another object is to provide a breading machine with the minimum number of moving parts consistent with the other objects.

The overriding object of this invention is to provide a reasonably priced, simple, and sanitary breading machine which is suitable for coating a variety of food products, and which will correctly apply at least two of the primary classifications of breading material to the food products.

BRIEF DESCRIPTION OF THE DRAWINGS

In the drawings

FIG. 1 is a side elevation of the complete breading machine of this invention in the flour breading mode.

FIG. 2 is an elevation of the infeed end of the breading machine of FIG. 1.

FIG. 3 is a top plan view of the breading machine of FIG. 1, with the dust covers removed.

FIG. 4 is a sectional view taken on line 4—4 in FIG. 2.

FIG. 5 is a partial sectional view similar to FIG. 4, with the discharge conveyor in a free-flowing mode.

FIG. 6 is a section taken on line 6—6 in FIG. 1.

FIG. 7 is an isometric view of the fixed half of the vertical screw housing of this invention.

FIG. 8 is an isometric view of the movable half of the vertical screw housing of this invention.

FIG. 10 is a schematic plan view of the hopper of this invention showing breading action when the hopper belt is first started in a nearly full hopper.

FIG. 11 is similar to FIG. 10, and shows breading action during normal operation of the breading machine.

FIG. 12 is similar to FIG. 10, and shows breading action when hopper holds minimum safe reservoir of breading.

FIG. 13 is similar to FIG. 10 and shows breading action just before top discharge starts to be lost.

FIG. 14 is a vertical sectional view taken similar to FIG. 4, showing the breading machine completely opened for cleaning.

FIG. 15 is an isometric view of the slot roof of this invention.

FIG. 16 is a plan view in schematic form of a typical and commonly used flat bottomed hopper with belt discharge.

FIG. 17 is a sectional view of the hopper of FIG. 16, taken on line 17—17 of FIG. 16.

FIG. 18 is a schematic sectional view of the hopper of this invention, illustrating breading action in the hopper taken on line 18—18 of FIG. 12.

FIG. 19 is a partial section taken on line 19—19 in FIG. 1, showing pivot arrangements for the hopper and slot roof.

FIG. 20 is a partial side elevation of the hopper of this invention showing the adjustment means for controlling hopper discharge.

FIG. 21 is a partial plan view of the hopper of this invention taken on line 21—21 of FIG. 20.

DESCRIPTION OF PREFERRED EMBODIMENT

Figure 9:
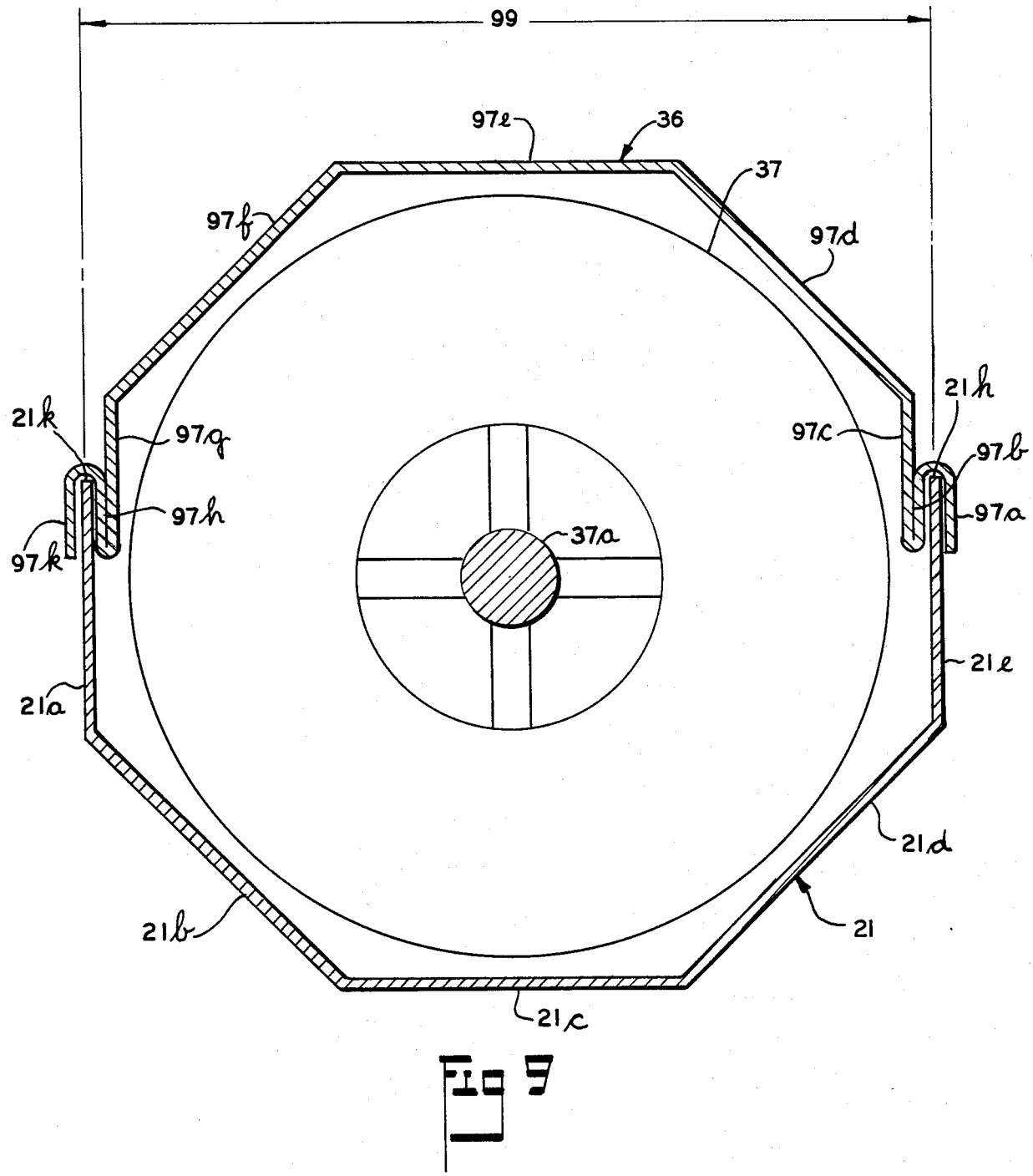
FIG. 9 is an enlarged section of the vertical screw housings taken on line 9—9 in FIG. 2.

Referring to FIGS. 1, 2, 3, 4, 6, 19 a breading machine 10 of this invention includes as major components frame 11 with pan 12, crossfeed screw 13, vertical screw assembly 14, hopper 15, product belt 16, slot roof 55 and discharge conveyor frame 72. Frame 11 includes legs 17, pan 12, main drive base 18, chain back plate 19, vertical screw drive bracket 20, vertical screw fixed housing half 21 with top plate 22, crossfeed housing 23, idler shaft 24 and idler shaft bracket 25, all of frame 11 being welded together. Pan 12 has a bottom wall 26, side walls 27 and 28, and top flanges 29 and 30. Crossfeed housing 23 is welded to wall 28 of pan 12, and wall 28 is perforated with a hole 31 which exactly matches the interior dimensions of crossfeed housing 23 so that breading may be freely passed from pan 12 into crossfeed housing 23 as later described. Crossfeed housing 23 is also welded to transition piece 32, transition piece 32 in turn being welded to vertical screw fixed housing half 21, the interior of transition piece 32 being open throughout so that breading material may be freely passed from crossfeed housing 23 through transition piece 32 into vertical screw fixed housing half 21 as later described. Idler shaft 24 is immovably fastened to wall 27 of pan 12 and idler shaft bracket 25.

Vertical screw assembly 14 consists of fixed housing half 21 which is part of frame 11, movable housing half 36, vertical screw 37, bearing 38 which is bolted to top plate 22 and vertical screw drive coupling 39. Top plate 22 is suitably perforated so that the shaft 37a of vertical screw 37 may pass therethrough and into bearing 38, and vertical screw drive bracket 20 is suitably perforated so that vertical screw drive coupling 39 may pass therethrough.

Hopper 15 has end walls 40 and 41 and side walls 42 and 43. The bottom edge of side wall 42 is formed into an open C-shaped channel 44, with the open side of channel 44 facing side wall 43. The bottom edge of side wall 43 is formed into an open C-shaped channel 45 with the open side of channel 45 facing side wall 42. A removable bottom wall 46 slides in channels 44 and 45 to form a movable bottom wall for hopper 15. Removable bottom wall 46 need not fit tightly into channels 44 and 45 to effect a seal against breading leaks. Breading will not migrate more than a small fraction of an inch into a small gap between two horizontal planar surfaces and there are two such gaps in series between bottom wall 46 and the inner horizontal surfaces of each of channels 44 and 45. Vertical lip 46a formed on the end of wall 46 extends outwardly and upwardly along the outer surface of end wall 40 and stops breading leaks between it and the outside of hopper wall 40 because breading will not migrate at all upwardly into a gap such as that between lip 46a and end wall 40 of hopper 15. No breading leaks at all are experienced between removable bottom wall 46 and hopper 15. The bottom edge of hopper wall 41 in this embodiment is bent to a horizontal flange 41a for stiffening side walls 42 and 43, and to form a sealing surface for the later addition of pressure roll cover 93. Hopper 15 is pivotably mounted on hollow hopper pivots 47, best seen in FIG. 19, which carry hollow projections 47a, the hollow projections 47a being passed into suitable holes 47b in side walls 42 and 43. The bottom side of channels 44 and 45 of side walls 42 and 43 rest respectively on top of flanges 29 and 30 of pan 12 during normal operation of the breader as best seen in FIG. 6. Hopper pivots 47 are bolted to the top of flange 29 and 30 of pan 12. Hopper drive shaft 48 carrying belt drive gears 49 is rotatably mounted in bearings 50, bearings 50 in turn being bolted to hopper pivots 47. Shaft 48 passes through hollow projections 47a on hopper pivots 47 and thence into bearings 50, as best seen in FIG. 19. Hopper idler shaft 51 carrying collars 155 is preferably immovably mounted between hopper walls 42 and 43 by bolts passing through walls 42 and 43 and thence into the internally threaded ends of shaft 51. Shafts 48 and 51 carry endless hopper belt 52 as later described.

Hopper wall 43 carries an external duct portion 53 which removably mates with duct portion 54 permanently attached to vertical screw fixed housing half 21. Duct portions 53 and 54 form an enclosed duct to allow breading material to move from the inside of vertical screw assembly 14 to the inside of hopper 15 as will be fully described later.

Referring now to FIG. 15, slot roof 55 may be seen. Slot roof 55 has a top wall 56, a bottom wall 57, a short end wall 58, a longer end wall 59 and two side walls 60 and 61. Side wall 60 has an extension 60a above top wall 56, and extension 60b below bottom wall 57 and an end extension 60c beyond end wall 58, end extension 60c containing hole 62. Side wall 61 has an extension 61a above top wall 56, an extension 61b below bottom wall 57 and an end extension 61c beyond end wall 58, end extension 61c containing hole 63. The width of projections 60b and 61b is preferably more at locations 64 and 64' than at locations 65 and 65'. All walls 56, 57, 58, 59, 60, 61 are continuously welded where they join so that the enclosed volume is air and water tight.

Referring again to FIGS. 4 and 19, slot roof 55 is pivotably mounted on hollow slot roof pivots 66 with the bottom edges of extensions 60b and 61b of side walls 60 and 61 respectively resting on bottom wall 26 of pan 12. Pivots 66 pass through holes 62 and 63 in slot roof walls 60 and 61 respectively. Belt drive shaft 67 carrying belt drive gears 68 is rotatably mounted in bearings 69 bolted to the outside of walls 27 and 28 of pan 12. Walls 27 and 28 are suitably perforated to allow hollow slot roof pivots 66 to pass therethrough. Shaft 67 then passes axially through the hollow center of slot roof pivots 66, thereby being free to rotate in bearings 69. Transition shaft 70 and cross rods 71 are all preferably immovably fixed between side walls 27 and 28 of pan 12.

Discharge conveyor frame 72 consists of side plate 73 and side plate 74 held in fixed relative position to each other by threaded fasteners not shown passing through suitable holes in side plates 73 and 74 and thence into internally threaded holes in the ends of each cross rod 75, vibratory supports 76 and belt support 77. Side plates 73 and 74 are equipped with bearings not shown in correct position to rotatably support nose shafts 78, 79 each fitted with collars 96, and reverser shaft 80 fitted with collars 81. Side plate 73 is pivotably constrained at slot 82 in side wall 27 of pan 12 so that plate 73 may pivot in a vertical plane with slot 82 as center, or plate 73 may move horizontally. Similarly side plate 74 is pivotably constrained at matching slot 83 in side wall 28 of pan 12. Thus, the entire discharge conveyor frame 72 may pivot in a vertical plane about slots 82 and 83, or frame 72 may move horizontally to the extent of the slots. Cross rod 84 is rigidly fastened inside pan 12 by a threaded fastener passing through slot 85 in wall 27 and another fastener passing through slot 86 in wall 28, and thence into the internally threaded ends of cross rod 84. Cross rod 84 may then be positioned at any horizontal position along the length of slots 85, 86, to hold discharge conveyor frame 72 in any horizontal position desired.

Cross rods 71 support imperforate belt supports 87 and 88 in a desirable position within pan 12. Spring loaded vibrators 76a are mounted on vibrator supports 76 in position to automatically vibrate product belt 16 as it passes to assist in removing excess breading material from under and around product pieces. Product belt 16 must be perforated for a very high percentage of its area and is preferably made from Flat-Flex belting as made by Wire Belt Co. of America. Belt 16 has an inclined section 16a, between main drive shaft 67 and transition shaft 70, which runs in close proximity to top wall 56 of slot roof 55. Horizontal section 16b of belt 16 extends from transition shaft 70 to nose shaft 78, partially supported by belt supports 87 and 88. Horizontal section 16c runs from nose shaft 78 to reverser shaft 80, and horizontal section 16d runs from reverser shaft 80 to nose shaft 79. A final horizontal return run 16e runs from nose shaft 79 to main drive shaft 67. A slot gate 89 is pivotably mounted in side walls 27 and 28 of pan 12 to control breading material flow to a product receiving layer on product belt 16a. Gate 89 may be pivoted to any desired angle and locked therein by means shown in FIGS. 20, 21. Hopper gate 90 is pivotably mounted in side walls 42 and 43 of hopper 15 to control breading material flow to a product covering layer on product belt 16b. Gate 90 may be pivoted to any desired angle and locked therein by means shown in FIGS. 20, 21. Pressure roll 91 is rotatably mounted in bearings not shown, to produce compacting pressure on breading material on and around product on product belt 16b. Hopper cover 92, pressure roll cover 93, discharge cover 94 and end closure 95 are all removable dust control features with minimum fastenings to breading machine 10.

Inlet shroud 100 is removably mounted at the infeed end of pan 12 to contain breading material as it passes from under slot roof 55 to the top of wall 56 of slot roof 55. Shroud 100 is removable to permit breading machine 10 to be essentially emptied of breading at the end of operation. The configuration of shroud 100 may be any of many forms as long as it will seal against the end flanges of pan 12.

Referring now to FIG. 5, the discharge conveyor frame 72 may be seen in a mode suitable for running breading machine 10 with free flowing breading material. Frame 72 is assembled with side plates 73 and 74 upside down and changed in relation to their position in FIGS. 1 and 4. Nose shaft 78 has been moved to position 78', nose shaft 79 has been moved to position 79', reverser shaft 80 has been moved to position 80', vibrator support 76 has been moved to position 76' and belt support 77 has been moved to position 77'. Belt sections 16b, 16c, 16d and 16e have all changed length, but the total length of product belt 16 remains the same. Product discharge to further processing is from nose shaft 78 in position 78' whereas in FIGS. 1 and 4 product discharge was from nose shaft 79.

Referring now to FIG. 7 the construction of the vertical screw fixed housing half 21 may be seen. Housing half 21 is made from a single sheet of stainless steel bent on four parallel lines to form five sides 21a, 21b, 21c, 21d, 21e, of a tube with a nearly octagonal cross section. Sides 21a and 21e are less than full width sides as best seen in FIG. 9. The included angle between any two adjacent sides is one hundred thirty-five degrees. Lower end 21f is positioned accurately on vertical screw drive bracket 20 and fully welded thereto. Upper end 21g is accurately positioned and completely welded to top plate 22. The combination of accurate positioning and full welding insures that edges 21h and 21k are truly parallel in a vertical plane. Transition piece 32 is shown for reference only.

Referring now to FIG. 8, the vertical screw movable housing half 36 may be seen. A single sheet of stainless steel 97 is bent on four parallel lines to form five sides 97c, 97d, 97e, 97f, 97g of a tube of nearly octagonal cross section. Sides 97c and 97g are less than full width sides as best seen in FIG. 9. The included angle between any adjacent two of these five sides is one hundred thirty-five degrees. An additional four bends on lines parallel to the original four bends form narrow parallel slots outside of sides 97c and 97g. The bend between side 97c and slot wall 97b is 180° so the outside of slot wall 97b and the outside of side 97c are actually touching full length. The bend between slot wall 97b and slot wall 97a is also 180°, but slot walls 97a and 97b are parallel and about one-eighth inch apart. The bend between side 97g and slot wall 97h is 180° so that the outside of slot wall 97h and the outside of 97g are touching full length. The bend between slot wall 97h and slot wall 97k is also 180°, to make slot walls 97h and 97k parallel and about one-eighth inch apart. The ends of sheet 97 are accurately positioned and fully welded to end plates 98 so that all bend lines are truly parallel. It is also important that the horizontal center to center dimension 99 between slots be equal to the horizontal center to center distance between edges 21h and 21k of vertical screw fixed housing half 21 as seen in FIG. 7.

Referring now to FIG. 9, the relationship between vertical screw housing halves 21 and 36 may be seen. Edge 21k of side 21a of housing half 21 is inserted into the slot formed by slot walls 97h and 97k of housing half 36. Similarly, edge 21h of side 21e of housing half 21 is inserted into the slot formed by slot walls 97a and 97b of housing half 36. As housing half 36 is moved closer to housing half 21 so that side 97e of housing half 36 approaches side 21c of housing half 21, edges 21h and 21k are pressed ever tighter into their respective slots in housing half 36. Edges 21h and 21k eventually reach the bottom of their respective slots in housing half 36 to very effectively seal the vertical joints in the housing.

Referring to FIGS. 1, 3 and 4, the configuration and arrangement of the crossfeed screw 13 may be seen. Screw 13 has an axial shaft 13a rotatably mounted in bearings 33 and 34, bearing 33 being bolted to the outside of wall 27 of pan 12 and bearing 34 being bolted to the outside of crossfeed and closure plate 35. Wall 27 of pan 12 and end closure plate 35 are both perforated with suitable holes to permit shaft 13a to pass therethrough and thence into bearings 33 and 34. The helical portion of screw 13 as seen in FIGS. 3 and 4 extends from close proximity to the inside of wall 27, through hole 31 in wall 28 of pan 12 and partway into the interior of crossfeed housing 23. As seen in FIG. 4, the helical portion of screw 13 is spaced above bottom wall 26 of pan 12 a minor fraction of an inch, about three-eighths, and away from wall 59 of slot roof 55 about an inch.

Referring now to FIGS. 2, 3, and 9, it may be seen that when vertical screw movable housing half 36 is installed on breading machine 10, all of housing half 36 is below top plate 22 of fixed housing half 21 and above drive bracket 20, with end plates 98 of housing half 36 in close proximity to the under side of top plate 22 and the top side of drive bracket 20. Close proximity in this case means that end plates 98 of housing half 36 will be parallel to top plate 22 and drive bracket 20, and that the gap between end plate 98 and either top plate 22 or drive bracket 20 may be about one-sixteenth of an inch. Experience with other breading handling equipment has shown that when two rigid planar surfaces are parallel and at rest relative to each other, with a gap between of as much as one-sixteenth inch, that breading will not migrate by vibration more than about one inch from a gap edge into the gap. Therefore, because the minimum width of the gaps between an end plate 98 and either top plate 22 or drive bracket 20 is more than one inch, there is no fear of breading leaks from the gaps. Indeed, no leaks have developed in prototype machines of this invention.

Locks in some form are necessary to hold housing half 36 in the necessary close proximity to housing half 21, and in this embodiment are simple thumb screws, one of which passes vertically downward through a threaded hole in top plate 22 of housing half 21 and into a matching unthreaded hole in top end plate 98 of housing half 36, with the second thumb screw passing vertically upward through a threaded hole in vertical screw drive bracket 20 into a matching unthreaded hole in bottom end plate 98 of housing half 36. Many other forms of locks could be used in place of the thumb screws.

It should be noted here that the length of the vertical screw assembly 14 of this invention is far less than other typical breading machines previously mentioned, and extends from only slightly below the return run 16e of product belt 16 to slightly above the top of hopper 15. In this embodiment, the actual length from the top of vertical screw drive bracket 20 to the under side of top plate 22 of housing half 21 is less than thirty-three inches. This short length is not only less expensive to make, but is far easier to seal full length than are the long vertical screws described previously.

Referring now to FIGS. 16 and 17, a typical flat bottomed hopper now in common use is schematically shown for discussion of breading flow. The hopper has a rear wall 120, a front wall 121, side walls 122 and 123, a bottom wall 124, a discharge belt 125, a belt drive pulley 126 and a belt idler pulley 127. Belt 125 may be imperforate or it may be open mesh. A slot 128 in front wall 121 is adjustable in height by moving slot gate 129 up or down as desired. Belt 125 moves in the direction of arrow 130 to carry the hopper contents out of the hopper. The amount of material carried out of the hopper by belt 125 is governed by the height of slot 128. Any excess material in the hopper will pile up against front wall 121 approximately as shown by lines 131 or 132 in FIG. 16 and lines 133 or 134 as seen in FIG. 17. In possible situation A, when material is fed into the hopper at a point near to wall 120 and midway of the width of wall 120 in FIG. 16, and at the same rate as material is discharged, the outline of the pile will stabilize in a manner similar to lines 131 or 132, 133 or 134. The corners between walls 120 and 122, and between walls 120 and 123 will always remain empty. In possible situation B, when material is fed into the hopper at a point near to wall 120 and also near to wall 123, the peak of line 135 in FIG. 16 will be near wall 123 with the result that more material must be retained in the hopper in order to reach the end of the discharge slot 128 which is nearest wall 122. In practice, situation A requires that the horizontal length of walls 122 and 123 be at least one-half the horizontal length of walls 120 and 121, and situation B requires that the horizontal length of walls 122 and 123 be at least equal to the length of walls 120 and 121. It may now be seen that in a hopper as illustrated in FIGS. 16 and 17, wherein the upper run of an endless belt is the material discharging run, and wherein the filling means is at one side, the filling means must be at least as far from the discharging slot 128 as the discharging slot is long in a horizontal plane.

Referring now to FIG. 18, hopper 15 of this invention is schematically shown partially full of breading material. Endless belt 52 must be perforated for a very high percentage of its area and is preferably the belt material known as Flat-Flex and manufactured by the Wire Belt Company of America. As belt 52 travels in the normal manner shown by arrows 141 and 142, lower run 52a of belt 52 will carry practically all breading material in the direction of arrow 142 toward drive shaft 48. However, hopper gate 90 will stop most of the mass of breading 143. The slot 144 between the lower edge of gate 90 and the upper surface of bottom wall 46 will only permit a layer of breading to pass toward drive shaft 48. The movement of the breading mass 143 generates some internal pressure in the mass 143 near gate 90, and this pressure acts on the mass 143 in a somewhat fluid manner near gate 90 so that some breading wells up through upper run 52b of belt 52 at 145. Belt run 52b is moving in direction of arrow 141, so that breading mass 146 above belt run 52b is carried in the same direction as arrow 141 until it reaches angle of repose slope 147 where it falls through belt run 52b and rejoins breading mass 143. Breading mass 146 will usually be relatively thin, on the order of an inch thick or less, depending upon the total volume in breading mass 143. Hopper gate 90 can be pivoted in the directions of arrows 148 to increase or decrease the height of slot 144, thereby increasing or decreasing the amount of breading discharged over edge 149 of bottom wall 46. Either free flowing or flour breading can be discharged from hopper 15 in the manner described, yet the hopper will not leak breading when idle, even when full of breading.

Referring now to FIGS. 10, 11, 12, 13, the breading action in a hopper of this invention may be more fully discussed. In FIG. 10, a hopper full of breading is shown just after initial start, with upper run 52b of hopper belt 52 moving in the direction of arrow 141. Breading mass 146 is above upper run 52b of belt 52 and moving with belt run 52b in the direction of arrow 141. The main mass of breading 153 due to filling the hopper is above belt run 52b and against wall 40 of hopper 15 with line 154 defining the join between masses 146 and 153. The mass 143 of breading between belt runs 52a and 52b as seen in FIG. 18 cannot be seen in FIG. 10, nor can belt run 52b be seen because it is covered by masses 146 and 153.

FIG. 11 shows how the breading material in hopper 15 looks during normal operation of the breading machine 10. Excess breading is continually returned to the hopper 15 via the vertical screw arrangement and duct portion 53, therefore the shape of breading mass 153 changes to that shown, piling up mostly in the corner between walls 40 and 43. Line 154 now extends from wall 43 to wall 40 of hopper 15, rather than from wall 43 to wall 42 as in FIG. 10. As the portion of breading mass 146 closest to wall 42 reaches line 150, breading falls through belt run 52b into the breading mass 143 between belt runs 52b and 52a, as described for FIG. 18. As the breading falls into breading mass 143, it tumbles in the direction of arrows 151 down the angle of repose 147 of mass 143 as seen in FIG. 18. The lower extent of the angle of repose 147 is line 152 seen in FIG. 11. FIG. 12 shows a further decline in the amount of breading in hopper 15, as breading is removed from breading machine 10 by the coated food product. If an additional supply of breading is not added to the machine, FIG. 13 shows the absolute minimum of breading which will still produce a full width discharge of breading from slot 144 as seen in FIG. 18. The only remaining breading in the hopper 15 is mass 143 between belt runs 52a and 52b, and a small mass 146 above belt run 52b.

It must be emphasized that the efficiency of the hopper of this invention is due to the use of both belt runs 52a and 52b to control breading flow. Breading cannot pile high against wall 41 in hopper 15 as it does against wall 121 of the hopper shown in FIGS. 16 and 17, because belt run 52b continually moves excess breading back toward wall 40 of hopper 15. However, as the breading mass 146 moves toward wall 40, it can only move to line 150 where it must follow arrows 151 down toward bottom wall 46. Thus excess breading from mass 146 continually moves partially toward wall 42, thereby insuring that the end nearest wall 42 of slot 144 as seen in FIG. 18 is well supplied with breading, with less breading in the hopper than is the case with the hopper of FIGS. 16 and 17.

The net effect of the breading action as shown in FIGS. 10, 11, 12, 13, 18 is that when breading is returned at a side 43 of hopper 15, the horizontal length of wall 43 may be much less than the horizontal length of wall 40. If breading return chute 53 is close to wall 41 of hopper 15, then the horizontal length of wall 43 need be only about one-half the horizontal length of wall 40. Thus the hopper need be only about half the area of the hopper described in FIG. 16 when entry is at side 123 in FIG. 16. In addition, when side entry into the hopper is possible, as in this invention, then the vertical screw assembly 14 as seen in FIG. 2 will not extend above the top of hopper 15, while the vertical screw assemblies in U.S. Pat. Nos. 3,647,189 and 4,128,160 both extend well above the hoppers in those patents. Further, the vertical screw assembly 14 as seen in FIG. 2 does not require the equivalent of chute 34 as seen in U.S. Pat. No. 3,647,189 or the chute indicated but not numbered in FIG. 2 of U.S. Pat. No. 4,128,160. Finally, the use of the vertical screw assembly of this invention permits the use of a very simple hopper cover 92 as seen in FIG. 4.

Referring now to FIGS. 1 and 2, the drives may be seen for the breading machine of this invention. In this embodiment, a variable speed electric drive consisting of motor 160, gearbox 161, and other components furnish rotation to roller chain sprocket 162. Sprocket 163 is fixed on hopper drive shaft 48, sprockets 164 and 165 are fixed on crossfeed screw shaft 13a, sprocket 166 is free to rotate on idler shaft 24 and sprocket 167 is fixed on belt drive shaft 67. An endless roller chain 168 extends from counterclockwise around sprocket 162 to counterclockwise around sprocket 163, to clockwise around sprocket 164 to counterclockwise around sprocket 166 and back to sprocket 162. A second endless roller chain 169 extends from clockwise around sprocket 165 to clockwise around sprocket 167 and back to sprocket 165. Thus a single drive source turns the three driven shafts 48, 13a and 67 in the correct directions, and sprocket sizes can be calculated for any desired relative rotational speeds between shafts 48, 13a and 67. It should be noted that any of several types of electric drives can furnish rotation to sprocket 162, including any of several types of variable speed drives. It should also be noted that the electric drive can be replaced by a hydraulic drive, wherein a variable speed hydraulic motor furnishes rotation to sprocket 162. A main drive method for the shafts 48, 13a, and 67 is essential, but the type of drive is not critical. Also in this embodiment, a fixed speed motor 170 drives a gear reducer 171 mounted on vertical screw drive bracket 20. The output shaft of gear reducer 171 is fixed into vertical screw drive coupling 39, so that the bearings within gear reducer 171 maintain alignment of the lower end of vertical screw shaft 37a. The use of a fixed speed drive for the vertical screw is far simpler than driving the screw from the main drive, and it has other advantages. If the vertical screw were driven by the main drive, the vertical screw must run at an optimum speed when the main drive is operating at its slowest speed. Then when the main drive runs at faster speeds, the vertical screw will run faster than optimum, sometimes two to three times optimum. Vertical screw speeds much higher than optimum destroy breading faster and wear out components faster. A fixed speed vertical screw can always run at optimum speed, regardless of main drive speed. Optimum speed for the vertical screw of this invention is about three hundred to three hundred fifty revolutions per minute. A further advantage to the fixed speed drive for the vertical screw is that the vertical screw may be turned by hand during cleanup, for access to all surfaces. This is not possible when the vertical screw is driven by the main drive arrangement. It should be noted that if the main electric drive is replaced by an hydraulic drive motor, the fixed speed vertical screw drive can also be replaced by a variable speed hydraulic motor. In this case, the hydraulic motor shaft would be fixed in the vertical screw drive coupling 39. The advantage of a fixed speed vertical screw drive would be partly lost if the vertical screw drive were hydraulic, but the advantage of a separate drive is maintained.

Referring now to FIG. 14, the breading machine of this invention may be seen in a fully open position for cleaning. Vertical screw movable housing half 36, inlet shroud 100, hopper cover 92, pressure roll cover 93, discharge cover 94, end closure 95, hopper bottom pan 46, pressure roll 91, and belt supports 87 and 88 have all been removed without tools and do not show in FIG. 14. In addition, hopper 15 has been pivoted clockwise about 90° from its operating position, discharge conveyor 72 has been pivoted about 110° counterclockwise from its normal operating position, and slot roof 55 has been pivoted about 45° counterclockwise from its normal operating position. In the configuration of FIG. 14, all surfaces of the machine which come in contact with food are visible and all may be reached either by hand or with simple cleaning tools and water sprays. Cleaning is simple, fast and effective.

Referring to FIGS. 20 and 21, the adjustment means for hopper gate 90 may be seen. Gate 90 in this embodiment is stainless steel sheet, J-shaped for rigidity, and has a cylindrical pivot block 90a welded into the curve of the J. Pivot block 90a passes through a suitable hole in hopper wall 42. A similar arrangement serves as a gate pivot not shown through hopper wall 43 not shown.

Hopper adjustment lever 175 consists of a disc 176, a one-quarter inch diameter rod 177 welded to disc 176, a short cross rod 178 welded to rod 177 and a hand knob 179 attached to one end of rod 178. Disc 176 is fastened to the end of hopper pivot 90a where 90a projects through hopper wall 42. A series of holes 180 in hopper wall 42 complete the adjustment means. Seven holes 180 in this embodiment are equally spaced on an arc traced by cross rod 178 when hopper gate 90 is pivoted. Holes 180 are slightly larger than the diameter of cross rod 178 so that the free end 178a of cross rod 178 may easily slip into any hole 180. As shown, when knob 179 is in position A, gate 90 is in position A', or fully open. When gate 90 is in position B, gate 90 is in position B' which is as near closed as is practical in this embodiment. When the position of gate 90 must be changed for any reason, the operator grasps knob 179 and pulls moderately in the direction of arrow 181 in FIG. 21. Rod 177 will flex, allowing the end 178a of rod 178 to be withdrawn from a hole 180. While maintaining the pull on knob 179, the operator can move rod 178 to any other hole 180. Releasing the knob 179 allows rod end 178a to enter the selected hole 180. The adjustment means described above is simple and positively locking at any position desired. It should be noted that the adjustment means for slot gate 89 as seen in FIGS. 1 and 4 is similar to the adjustment means described for hopper gate 90. It should also be noted that the method of fastening disc 176 to gate pivot 90a can be any of several methods. For instance, a square projection on gate pivot 90a could enter a square hole in disc 176, or a narrow tang on gate pivot 90a could enter a slot in disc 176.

Referring now to FIGS. 2, 3, 4, the operation of the crossfeed screw 13 can be described. It is known by those skilled in the art of screw conveyors, that a horizontal screw conveyor must be at least partially enclosed in order to move material axially along the screw. Frequently, the enclosure consists of a U-shaped trough with a bottom radius slightly greater than the diameter of the screw. The top of the U-shape may be either covered or uncovered, for a highly efficient design. However, in the breading machine of this invention, high efficiency of the crossfeed screw 13 is not critical, so that the enclosure for crossfeed screw 13 can be greatly simplified. In this invention, the crossfeed screw section between side walls 27 and 28 of pan 12 may be considered to have a partial enclosure consisting of a bottom wall being that portion of pan bottom 26 directly under screw 13, and a side wall being end wall 59 of slot roof 55 together with slot gate 89. Screw 13 has lefthand helical flighting and rotates in a clockwise direction so that the two walls as described for screw 13 allow the screw to function in a very satisfactory manner. The placement of screw 13 above belt run 16e thus utilizes existing machine structures, which are primarily for other reasons, for the screw housing within pan 12. The special screw housings for crossfeed screws as are shown in U.S. Pat. Nos. 2,855,893—Greer, 3,596,189—Porter et al and 3,647,189—Johnson are thus eliminated.

It is now possible to fully describe the operation and advantages of the breading machine of this invention. Referring to FIGS. 2, 3 and 4, the hopper 15 can be filled with either flour or free flowing breading. Usually hopper gate 90 and slot gate 89 are adjusted for minimum flow. When the machine is started, both drive motors 160 and 170 will start, so all driven parts run at selected operating speed. Hopper belt 52 discharges a layer of breading over lip 149 of hopper bottom pan 46, the layer being the full horizontal width of hopper wall 41. This breading layer falls in a curtain toward imperforate belt support 87. Main product belt section 16b, moving from transition shaft 70 toward nose shaft 78, will move breading with it toward shaft 78. As breading reaches end 88a of belt support 88, free flowing breading will fall through belt portion 16b toward pan bottom 26. Flour breading may remain on belt portion 16b until belt vibrators 76a under belt portion 16b urge it through belt portion 16b. This falling breading, upon reaching pan bottom 26, is carried toward main drive shaft 67 by belt portion 16e. As breading moves with belt portion 16e, it first passes under crossfeed screw 13. If the layer is less than three-eighths inch thick, crossfeed screw 13 has no effect on this layer. The layer continues with belt portion 16e under slot gate 89, and into a pumping slot formed by bottom wall 57 of slot roof 55, side wall extensions 60b and 61b of slot roof 55, and bottom wall 26 of pan 12. Note here that the function and mechanics of this slot are described in U.S. Pat. Nos. 3,915,116; 3,967,583 and 4,016,299. The layer of breading on belt portion 16e will fill all voids around drive shaft 67, then a thin breading layer will start to move up top wall 56 of slot roof 55, the thin layer carried by belt portion 16a. This thin layer of breading on belt portion 16a is carried over onto belt portion 16b, where additional breading is added from the hopper as described above. Again, the breading from belt portion 16b falls through the belt at end 88a of belt support 88, and is carried by belt portion 16e toward main drive shaft 67. Now the breading is thicker on belt portion 16e, so some will be skimmed off the layer by crossfeed screw 13 and will be moved into crossfeed screw housing 23. Additionally, when the breading layer on belt portion 16e is thicker than can pass under slot gate 89, the excess above the bottom of slot gate 89 will be scraped off the layer and retained by slot gate 89 and end wall 59 of slot roof 55. As more breading is retained by slot gate 89 and end wall 59, some of this breading will be moved by crossfeed screw 13 into crossfeed screw housing 23. A steady state is reached quickly where any and all excess breading reaching slot gate 89 is moved by screw 13 into crossfeed housing 23.

As the actions above described continue, the breading carried into crossfeed screw housing 23 will discharge into the bottom of vertical screw housing assembly 14, there to be picked up by vertical screw 37 and carried upwards to duct 54 where it is discharged through duct 54 into duct 53 and thence back into hopper 15. The entire sequence as described from the start of motors 160 and 170 will take about thirty to forty seconds when product belt 16 is moving at forty feet per minute.

With the breading machine of this invention now running at a selected speed and circulating breading into product receiving layer on product belt portion 16a and under a product covering layer above product belt portion 16b, the thickness of the layers may be adjusted as desired. The top covering layer can be varied by adjusting hopper gate 90 by the means previously described in FIGS. 20 and 21. The bottom product receiving layer can be varied by adjusting slot gate 89 in a manner similar to that described in FIGS. 20 and 21 for gate 90. The adjustments are independent, and in this embodiment, the layers may be quickly and easily adjusted from about one-quarter inch thick to three-quarters inch thick. When ever the thickness of a breading layer is changed, the machine quickly attains a new steady state of operation. Any extra breading required is supplied by the hopper, and any excess that develops will be retained in the hopper. For instance, if a shovelfull of breading is manually added to belt portion 16b, it will quickly appear in hopper 15 and stay there until needed. Other embodiments of this invention can be built wherein the breading layers can be much thicker if desired.

In the embodiment shown in FIG. 4, pieces of food product already coated with batter in a machine not shown are deposited on the bottom breading layer on product belt 16 in the vicinity of transition shaft 70. After the top cover layer of breading is discharged from hopper 15 as previously described, belt portion 16b carries the product under pressure roll 91 to compact the breading on and around the product pieces and press the breading into the batter on the product pieces.

As the product reaches belt support end 88a, excess breading under and around the product pieces falls through belt portion 16b as previously described. The product pieces still carrying an excess of breading on top reach nose shaft 78, and turn upside down as they are discharged over nose shaft 78. Excess breading which was on top of the product pieces falls off and through belt portion 16d to pan bottom 26, where it is engaged by belt run 16e and carried back toward drive shaft 67 for recycling. The finished product is then discharged over shaft 79 from belt portion 16d to further processing. The method of breading product as described in this paragraph is especially suited to flour type breading and is sometimes acceptable for use with free flowing breadings.

However, as previously mentioned in the description of FIG. 5, free flowing breading is usually used in conjunction with a product carrying belt which does not flip the food product to remove excess breading. When the discharge conveyor 72 is used in the mode of FIG. 5, excess breading is removed from the top of the food pieces by using an air curtain similar to that shown in U.S. Pat. No. 3,647,189. Perforated air tubes not shown may be inserted through holes 156 in the side walls 27 and 28 of pan 12 in any of several combinations. The tube perforations then deliver multiple air streams to remove the excess breading from the top of the product pieces. This method of removing excess breading is old art.

Several other features of the breading machine of this invention should be discussed. In FIG. 4 and FIG. 15, it can be seen that the pumping slot under slot roof 55 is higher at the discharge end of the slot nearest drive shaft 67 than it is at the inlet end of the slot nearest slot gate 89. This is a slight departure from the slot described in U.S. Pat. Nos. 3,915,116, 3,967,583 and 4,016,299 wherein the slot top wall is parallel to the slot bottom wall. The reason for the departure in the breading machine of the present invention is that certain flour-like breadings have a tendency to pack so tightly that it is difficult to move them if the pumping slot were to decrease even slightly in the vertical dimension at the slot discharge end. Therefore the pumping slot in the machine of the present invention is made definitely greater in vertical dimension at its discharge end so that no misalignment of parts can possibly cause adverse decreasing of the slot at the discharge end of the slot, and hence cause excessive packing of the breading.

Another feature of the machine of the present invention is the use of narrow belt drive gears 68. Standard gears as made by Wire Belt Co. of America are about nine-sixteenths of an inch in axial dimension, to allow space in this dimension for radial set screws used to fasten the gears to the drive shaft. However, in the breader of this invention, drive gears 68 are completely immersed in breading material. Whenever normal width drive gears are used fully immersed, breading material has a tendency to lift the belt wires off the gears and the gears then may not drive the belt. Therefore, as best seen in FIG. 19, drive gears 68 are of modified construction having a small diameter hub portion wide enough for radial set screws to fasten the gears to drive shaft 67, but having gear teeth only about three-sixteenths of an inch wide.

This gear has much less tendency to trap breading material between gears and belt wires so that no belt driving problems occur. In addition, because the gears are narrower than standard, less degradation of breading occurs due to crushing of larger particles of free-flowing breading between belt wires and drive gears.

Another feature of the breading machine of this invention is the relatively shallow angle formed by belt portion 16a and a horizontal plane, as seen in FIG. 4. Normally, most breading machines have the steepest angle possible which will still allow the product belt to move breading uphill with no roll back of breading. The angle is made steep to keep the machine as short as possible and to minimize the distance a batter machine has to reach in order to deposit food pieces at or beyond the transition shaft 70, but the angle can seldom be more than 23°. In the breading machine of this invention, the angle between belt portion 16a and horizontal plane is only 18° for good reason. In some situations when the machine is in a flour mode as seen in FIG. 4, the operator will want the product discharge elevation at nose shaft 79 to be as high as product inlet elevation at transition shaft 70. In these situations, the entire machine may be rotated in a vertical plane so that discharge shaft 79 is at the same elevation as transition shaft 70. Rotation is accomplished by adjusting caster stem lengths at the bottom of legs 17. In the rotated condition, the angle between product belt portion 16a and a horizontal plane increases only to 23°, which is still acceptable for operation.

It may now be seen that all objectives of this invention have been achieved. The hopper is very simple in construction and operation, and will operate equally well with either flour or free flowing breading. The vertical screw assembly is of simple construction, less than half the length of most vertical screw arrangements, and does not leak breading. Conversion from a flour breading mode to a free flowing breading mode requires less than one hour, is simple, and requires no additional conveyor parts. The machine opens for cleaning so that all surfaces are visible and easy to clean. Only four shafts must be driven versus up to seven shafts in other breading machines suitable for flour use.

It should be noted that drives are guarded for safety. Chain guards 157 and 158 as seen in FIGS. 1, 2, 3 completely cover all sprockets and roller chains, while a guard 159, indicated in broken lines in FIG. 2, covers motor pulleys and V-belt drive.

There are a number of possible variations in the construction of the breading machine of this invention. A single configuration as shown in FIG. 1 can be built in any of many widths, changing only those dimensions transverse to the machine. The pan 12 could be deeper or shallower, the total machine length longer or shorter. The angle between belt section 16a and horizontal plane could be made greater or smaller, the vertical distance between belt runs 16b and 16d could be greater or smaller. Hopper 15 could be higher or longer, vertical screw assembly 14 could be longer or have a larger or smaller tube. The sealing configuration between vertical screw housing halves 21 and 36 could be modified, or the lock mechanism between housing halves could be any of many possibilities. Removable covers could be hinged or fixed. None of these examples and many others should detract from the novelty of this invention.

We claim:

1. A hopper adapted for use with a breading machine for dispensing flour breading or free flowing breading onto work product, said hopper comprising a bottom wall in a horizontal plane and four vertical walls forming right angles between adjacent vertical walls, said four vertical walls including a feed side wall and an imperforate end wall and an imperforate side wall and a discharge end wall having a bottom edge spaced above said bottom wall to form a slot between said bottom edge of said discharge end wall and said bottom wall, an endless open mesh conveyor belt with a bottom run of said conveyor belt moving in close proximity to the top of said bottom wall in a direction toward said discharge end wall and a top run of said conveyor belt moving in a direction toward said imperforate end wall and spaced above said bottom wall and all edges of said conveyor belt spaced away from said feed side wall and said imperforate side wall, said bottom run and said top run extending through said slot at said bottom of said discharge end wall to a belt driving pulley means, said bottom run and said top run also extending to an idler pulley means within said hopper and in close proximity to both said imperforate end wall and said bottom wall, a partial closure bar extending horizontally between said feed side wall and said imperforate side wall with one face of said closure bar in approximately the same vertical plane as said discharge end wall and with the top surface of said closure bar being spaced below said top run and with the bottom surface of said closure bar being spaced above said bottom run, the space between said top and said bottom runs intermediate said idler pulley and said closure bar being unobstructed for movement of dry breading material through the open mesh of said top run to said bottom wall, said closure bar being movable so as to selectively vary the space between the bottom of said closure bar and said bottom run, means for furnishing a continuous supply of finely divided dry breading material near said feed side wall, said top run and said bottom run of said conveyor belt working in concert so that said bottom run may convey said dry breading material through the rectangular slot above said bottom wall and below said bottom surface of said closure bar to discharge said dry breading material outside said hopper, and said conveyor belt being said open mesh and operative to allow sufficient dry breading material to pass through said upper run and supply said rectangular slot, said top run also being operative to move any excess of said dry breading material backing up at the bottom of said closure bar, toward said imperforate end wall.

2. A hopper as defined in claim 1 wherein said partial closure bar is pivotable about a horizontal axis near said top surface of said closure bar and also parallel with the longest dimension of said closure bar so that the vertical dimension of said rectangular slot may be varied as desired.

3. A hopper as defined in claim 2 wherein said closure bar has a crank arm coupled thereto, said crank arm being disposed exteriorly of said hopper side walls whereby the position of said closure bar may be quickly varied by disengaging the free end of said crank arm from a fixed position and re-engaging said free end of said crank arm in a new position, said closure bar being of generally inverted J-shape in end elevation and having a cylindrical pivot block secured thereto and extending through an opening in one of said hopper side walls, said crank arm being attached to said pivot block for rotating said pivot block relative to said hopper side walls and thus selectively varying the said position of said closure bar.

4. A hopper as defined in claim 3 wherein said bottom wall of said hopper may be removed without using tools but said bottom wall is fixed in said hopper by leak proof means when said hopper is in operation.

5. A hopper as defined in claim 2 wherein said bottom wall of said hopper may be removed without using tools but said bottom wall is fixed in said hopper by leak proof means when said hopper is in operation.

6. A hopper as defined in claim 1 wherein said bottom wall of said hopper may be removed without using tools but said bottom wall is fixed in said hopper by leak proof means during operation of said hopper.

7. A hopper as defined in claim 1 wherein said means for furnishing a continuous supply of finely divided dry material includes a through opening near the top of said feed side wall.

8. A hopper as defined in claim 7 wherein said partial closure bar is pivotable about a horizontal axis near said top surface of said closure bar and also parallel with the longest dimension of said closure bar so that the vertical dimension of said rectangular slot may be varied as desired.

9. A hopper as defined in claim 8 wherein said closure bar has a crank arm coupled thereto, said crank arm being disposed exteriorly of said hopper side walls whereby the position of said closure bar may be quickly varied by disengaging the free end of a said crank arm from a fixed position and re-engaging said free end of said crank arm in a new position, said closure bar being of generally inverted J-shape in end elevation and having a cylidrical pivot block secured thereto and extending through an opening in one of said side walls, said crank arm being secured to said pivot block and extending upwardly therefrom, the upper end of said crank arm having a cross rod extending inwardly toward said one side wall, said one side wall having a plurality of openings disposed in an arc coincident with the arc of movement of said cross rod during pivoting of said crank arm and attached pivot block, said cross rod being adapted to be received in the selected one of said openings for positioning said closure bar in selected position, said crank arm having sufficient flexure whereby outward lateral movement of said crank arm relative to said one side wall disengages said cross rod from coaction with the coacting one of said openings providing for pivotal movement of said crank arm to another of said openings for receiving said cross rod therein to thus vary the position of said closure bar.

10. A hopper as defined in claim 8 wherein said bottom wall of said hopper may be removed without using tools but said bottom wall is fixed in said hopper by leak proof means when said hopper is in operation.

11. A hopper as defined in claim 7 wherein said bottom wall of said hopper may be removed without using tools but said bottom wall is fixed in said hopper by leak proof means when said hopper is in operation.

12. A hopper as defined in claim 7 wherein said bottom wall of said hopper may be removed without using tools but said bottom wall is fixed in said hopper by leak proof means during operation of said hopper.

* * * * *